United States Patent
Kubala et al.

(10) Patent No.: US 10,977,046 B2
(45) Date of Patent: Apr. 13, 2021

(54) INDIRECTION-BASED PROCESS MANAGEMENT

(71) Applicant: International Business Machines Corporation, Armonk, NY (US)

(72) Inventors: Jeffrey Paul Kubala, Poughquag, NY (US); Seth Lederer, Staatsubrg, NY (US); Alberto Poggesi, Palo Alto, CA (US); Hunter Kauffman, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 108 days.

(21) Appl. No.: 16/292,434

(22) Filed: Mar. 5, 2019

(65) Prior Publication Data
US 2020/0285481 A1 Sep. 10, 2020

(51) Int. Cl.
*G06F 9/38* (2018.01)
*G06F 9/50* (2006.01)

(52) U.S. Cl.
CPC .......... *G06F 9/3855* (2013.01); *G06F 9/5055* (2013.01); *G06F 9/5061* (2013.01)

(58) Field of Classification Search
CPC ..... G06F 9/5061; G06F 9/5055; G06F 9/3855
See application file for complete search history.

(56) References Cited

U.S. PATENT DOCUMENTS

| | | | | |
|---|---|---|---|---|
| 5,418,913 | A | * 5/1995 | Fujimoto | G06F 5/065 707/999.104 |
| 9,400,615 | B2 | 7/2016 | McKean et al. | |
| 9,886,328 | B2 | 2/2018 | Newburn | |
| 2004/0010667 | A1 | * 1/2004 | Brenner | G06F 9/5088 711/158 |
| 2005/0210472 | A1 | * 9/2005 | Accapadi | G06F 9/5033 718/105 |

(Continued)

OTHER PUBLICATIONS

Anonymously; "Method and Approach to Implement Smart Electronic Queue Management System," IP.COM, Jul. 26, 2012. pp. 6.

(Continued)

*Primary Examiner* — Zachary K Huson
(74) *Attorney, Agent, or Firm* — Cantor Colburn LLP; Edward Wixted

(57) ABSTRACT

Embodiments of the present invention are directed to a computer-implemented method for process management. The method includes assigning a drawer and a physical processor to each element of a first ready queue pointer array, wherein each element of the first ready queue pointer array is configured to point to a memory address of a ready queue header. The method further includes assigning the drawer and the physical processor to each element of a second ready queue pointer array, wherein each element of the second ready queue pointer array is configured to point to the same ready queue header as a respective element of the first ready queue pointer array. The method further includes detecting that either a physical processor has become unavailable to process executable instructions or that a ready queue is empty. The method further includes allocating an available physical processor and a ready queue with executable instructions.

20 Claims, 5 Drawing Sheets

(56) References Cited

U.S. PATENT DOCUMENTS

| | | | |
|---|---|---|---|
| 2006/0037017 A1* | 2/2006 | Accapadi | G06F 9/5088 |
| | | | 718/100 |
| 2015/0347192 A1* | 12/2015 | Blaine | G06F 9/5027 |
| | | | 718/103 |
| 2017/0177414 A1 | 6/2017 | Newbern et al. | |
| 2017/0262321 A1 | 9/2017 | Newburn | |

OTHER PUBLICATIONS

Anonymously; "Smart Queue System," IP.COM, Jun. 2, 2016. pp. 13.

Anonymously; "System and Method for Smarter Queue Management," IP.COM, Nov. 26, 2010. pp. 3.

Tsitsiklis, JN. et al., "Flexible Queuing Architectures," Google. 2012. pp. 46.

* cited by examiner

INDIRECTION-BASED PROCESS MANAGEMENT

BACKGROUND

The present invention generally relates to process management, and more specifically, to indirection-based process management.

Process management is a computer-based scheduling process that maximizes utilization of available central processor units (CPUs). Process scheduling also enables processors to switch execution between processes at such a high frequency that users can seemingly access multiple programs at once. In general, a process scheduler can select processes that are ready for execution and load them onto a ready queue. The process scheduler can then select processes from the ready queue and allocate an available CPU to execute the process.

SUMMARY

Embodiments of the present invention are directed to a computer-implemented method for indirection-based process management. A non-limiting example of the computer-implemented method includes assigning a drawer and a physical processor to each element of a first ready queue pointer array, wherein each element of the first ready queue pointer array is configured to point to a memory address of a ready queue header. The method further includes assigning the drawer and the physical processor to each element of a second ready queue pointer array, wherein each element of the second ready queue pointer array is configured to point to the same ready queue header as a respective element of the first ready queue pointer array. The method further includes detecting that either a physical processor has become unavailable to process executable instructions or that a ready queue is empty. The method further includes allocating an available physical processor to a ready queue with executable instructions. The method further includes executing instructions until each ready queue is empty.

Embodiments of the present invention are directed to a system for indirection-based process management. A non-limiting example of the system includes a processor having stored instructions, that when executed cause the processor to perform the computer-implemented method.

Embodiments of the invention are directed to a computer program product for indirection-based process management, the computer program product comprising a computer readable storage medium having program instructions embodied therewith. The program instructions are executable by a processor to cause the processor to perform the computer-implemented method.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
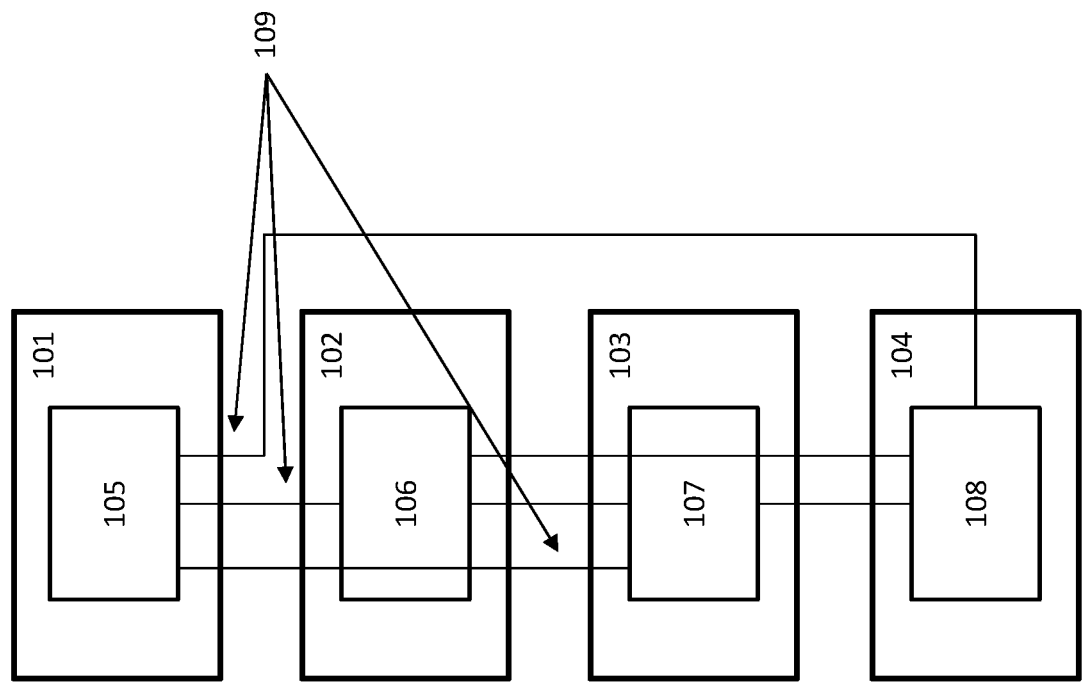
FIG. 1 depicts a block diagram of a unit of processing drawers for use in implementing one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention. Process scheduling is managed by a scheduler, which is a set of algorithms in an operating system that allocates processes to resources for completion. Among the goals of the scheduler are reducing the number of idle resources, increasing task completion efficiency, minimizing wait times, and minimizing response time. In general, schedulers include long-term schedulers, short-term schedulers, and medium-term schedulers. Long-term schedulers select which executable programs program are available for processing. Short-term schedulers or CPU schedulers select processes from a ready queue and allocate them to an available CPU. Medium-term schedulers move idle processes to secondary storage to create space for other processes.

Processes can be scheduled based upon various conventional schemes or combinations of schemes. For example, a scheduler can employ a first in first out (FIFO) scheme and allocate based upon a position in a ready queue. A scheduler can also employ a priority scheme and allocate processes based upon a process deadline.

An operating system maintains separate process scheduling queues. When a process is ready for execution, the scheduler can move the process to a ready queue and dispatch the process to a CPU. The operating system continuously updates process control blocks (PCBs) to identify the current state of the process. Processes that are ready to be executed are in a ready state. Processes that are waiting for an additional input/output signal are in a hold or idle state. Completed processes are considered terminated. Upon termination, the operating system updates the PCB associated with the process to reflect that the process is no longer allocated to a resource.

A ready queue is a data structure that includes an array of respective linked lists that store processes or threads from system memory that are ready to execute. A ready queue includes a header that stores a respective head pointer and can also include a tail pointer for each linked list. The head pointer points to the process or thread that is to be dequeued from the linked list and sent to a CPU for execution. The tail pointer, if present, points to the last process or thread enqueued on the linked list. It should be appreciated that operating systems generally rely on multiple ready queues to efficiently manage process scheduling.

Server architectures continue to incorporate more physical processors without significant increases in single threaded processor speeds. The increasing number of processors has led to the allocation of multiple processors to a single ready queue. Some computer architectures assign multiple processors to multiple ready queues. However, conventional scheduling and dispatch schemes still result in bottlenecks and high cache line collisions. Conventional process scheduling schemes can also lead to contention events, in which multiple processes are attempting to access the same resource.

Turning now to an overview of the aspects of the invention, one or more embodiments of the invention address the above-described shortcomings of the prior art by providing systems and methods for a processing scheme that assigns logical processors to queues based upon an outermost containment. The outmost containment in the herein described system includes the drawer and processor type. In some embodiments, the scheduler allocates ready queues by a CPU chip assignment within a drawer to take advantage of shared L3 cache on the chip. An indirection structure for the queues allows normal processing to always use the outermost containment dimensions to discover available drawer and processor combinations. The herein described process can be performed statically or dynamically depending on the complexity or the needs of a given application.

FIG. 1 depicts a system 100 of four interconnected processing units or drawers 101, 102, 103, 104 in accordance with one or more embodiments of the present invention. The system 100 can include four processing units or "processor drawers." Processor drawer 101 connects to drawer 102, drawer 103, and drawer 104 via a storage controller (SC) chip 105. The other processor drawers 102, 103, 104 each have a respective SC chip 106, 107, and 108. The SCs connect to each other via bus lines 109, which consequently connects the processor drawers 101, 102, 103, 104. Intra-drawer communication can be achieved by receiving and transmitting signals via a combination of these bus lines 109. Although, FIG. 1 depicts a system of four interconnected processing units or drawers, it should be appreciated that in other embodiments a system could include any number of processing units or drawers.

Figure 2:
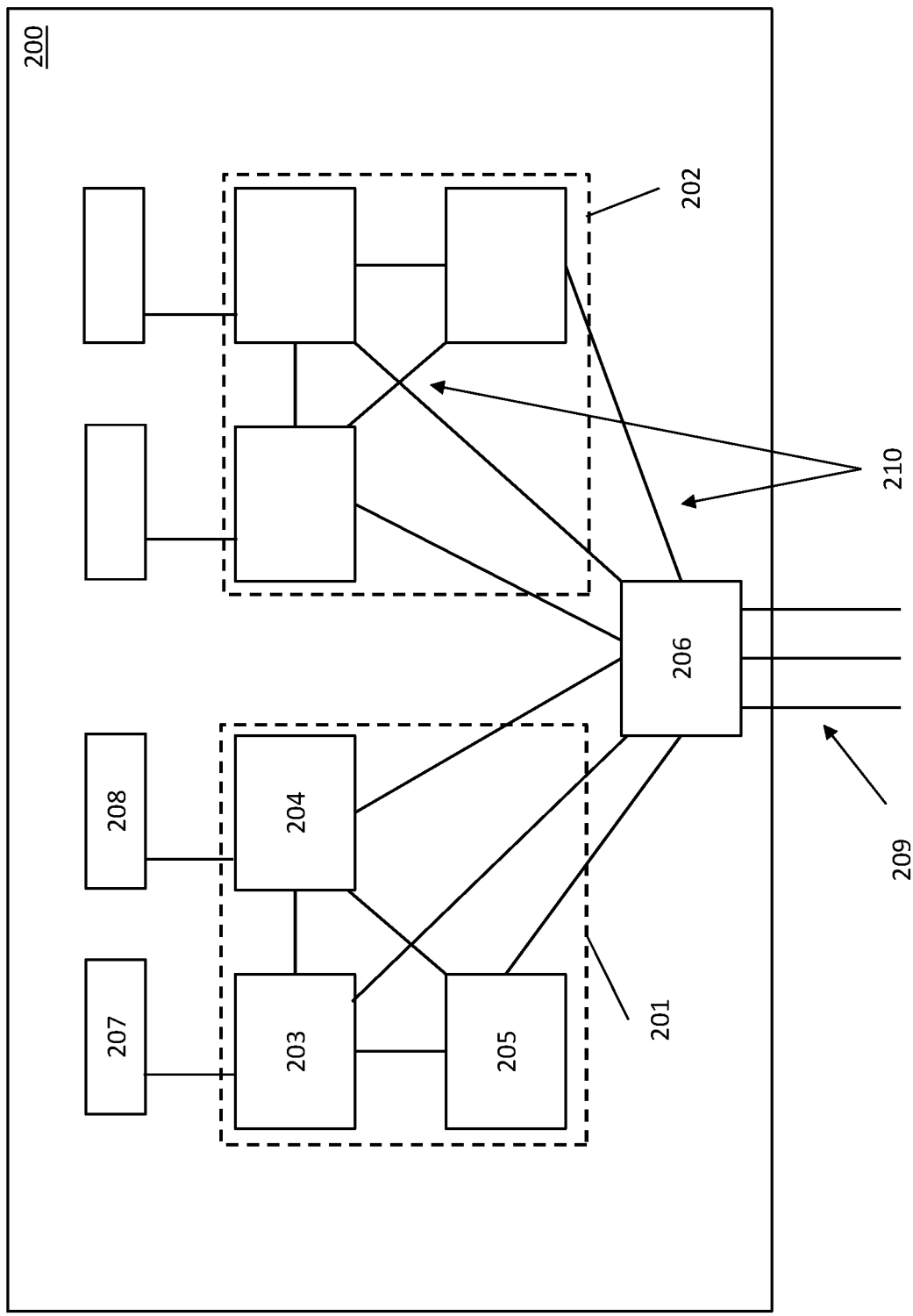
FIG. 2 depicts a block diagram of a processing drawer for use in implementing one or more embodiments of the present invention.

FIG. 2 depicts a processor drawer 200 including any one of the processor drawers 101, 102, 103, 104 shown in FIG. 1, according to one or more embodiments of the present invention. Referring now to FIG. 2, a processor drawer 200 includes two central processor (CP) clusters 201, 202. Each cluster 201, 202 includes three CP chips operatively connected to an SC chip and each other within the respective cluster. For example, CP cluster 201 includes three CP chips 203, 204, 205 operatively connected to each other and an SC chip 206. Each CP chip contains a respective L3 cache memory (not shown) shared by the logical cores on each CP chip. Each CP chip within a cluster may connect to system memory 207, 208. As seen in FIG. 2, CP cluster 201 is operatively connected with another CP cluster 202 via bus lines 210 through the storage controller 206. The processor drawer 200 is connected to other drawers via bus lines 209 as seen in FIG. 1. Although the processor drawer 200 seen in FIG. 2 includes two CP clusters with each having three CP chips, it should be appreciated that in other embodiments a drawer can include any number of CP clusters that each include any number of CP chips that can be used to execute any functionally as described herein.

CP chips can be allocated to support various processor types. For example, an Integrated Facility for Linux (IFL) is a specialty processor from IBM® dedicated to Linux workloads. Linux is a registered trademark of Linus Torvalds in the United States, other countries, or both. General purpose (GP) processors support applications across multiple languages, software, and hardware. Distributed array processors (DAPs) are separate processors directed towards a single application. Additionally, z Integrated Information Processors (zIIPs) are specialty IBM® processors that are designed to operate asynchronously with GP processors. The CP clusters can also be configured to support various other processors.

The SC chip 206 can be a logic circuit that manages cache memory and provides an interface between processors, caches, and main memory. Although FIG. 2 shows the SC chip 206 is external to the CP chips (203 204, 205), storage controllers can be integrated directly into the CP chips. The storage controllers incorporate L4 cache memory that can be shared by each of the CP chips in a respective processor drawer 101, 102, 103, 104.

Figure 3:
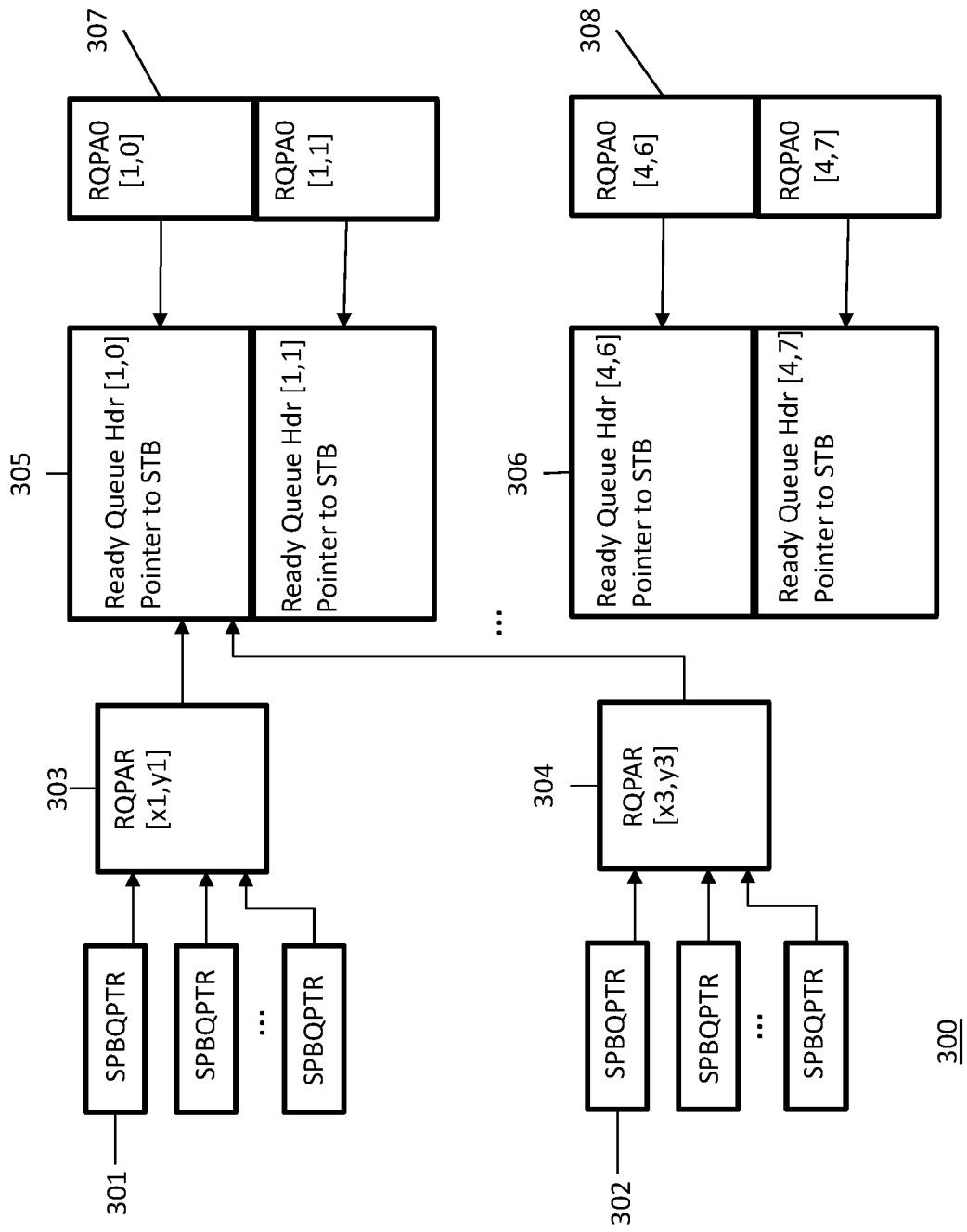
FIG. 3 depicts a block diagram of a process management system for use in implementing one or more embodiments of the present invention.

Referring to FIG. 3 a block diagram of the indirection structure is shown. FIG. 3 depicts physical processor blocks 301, 302 that are each configured to include one or more logical processors. Each physical processor block 301, 302 can comprise a CP chip as depicted in FIG. 2. The logical processors in each physical processor 301, 302 are configured to receive executable instructions from one or more ready queues. However, rather than point to a memory address of a ready queue, the physical processor blocks 301, 302 are configured to point to a second ready queue pointer array element 303, 304. The second ready queue pointer elements 303, 304 are configured to point to a memory address of a respective ready queue header 305, 306. Each ready queue header 305, 306 is configured to point to the memory address of a first executable instruction in a ready queue (not shown). The system initially allocates each ready queue to a specific drawer and a processor type. In FIG. 3, the ready queue header 305 points to a ready queue that is allocated to drawer 1 and logical processor type 0 as indicated by [1, 0]. In this illustration, the system is accommodating four drawers [1-4] and eight processor types [0-7]. However, the system can be configured to accommodate any number of drawers and any number of processors.

The system also includes first ready queue pointer array elements 307, 308. The first ready queue pointer array elements 307, 308 designate an initial allocation of drawers and processor types to ready queues. The first ready queue pointer array elements 307, 308 can be configured in multiple combinations. For example, each first ready queue pointer array element for each drawer and each processor can point to the same ready queue header or a combination of one or more ready queue headers. By performing this action, the system can increase or decrease the length of a ready queue allocated to a processor without adding additional instructions to a ready queue.

After a processor executes an instruction, it seeks additional work from a ready queue. The system is configured to assign workloads to a physical processor block 301, 302 through an indirection method. The physical processor blocks do not see that the second ready queue pointer array element 303, 304 is a pointer to another memory address. Rather, the physical processor blocks 301, 302 detects the instructions pointed to by the second ready queue pointer array elements 303, 304.

Periodically, the combination of the drawer and the physical processor becomes unavailable. For example, the processor is physically removed from the system, is damaged, or isn't configured to perform the available work in the ready queue. Another possibility is that the ready queue allocated to a drawer and processor combination no longer has any executable instructions. If a physical processor becomes unavailable, the system can reallocate its logical processor to another ready queue.

FIG. 3 illustrates a situation in which a drawer, processor, and ready queue combination is no longer available. In FIG. 3, a combination of drawer and processor [x3, y3] may have been initially allocated by a first ready queue pointer array element 304 to ready queue [4, 6]. In this illustrated system, either drawer 4 or processor 6 becomes unavailable, the available processors 302 can be redirected to ready queue [1, 0]. The operating system can write the memory address for ready queue header [1, 0] stored at the first ready queue pointer array element 303, to the second ready queue pointer array element 304. The available processors 302 are agnostic to the drawer and combination [4, 6] and through indirection receive available instructions from ready queue [1, 0].

Figure 4:
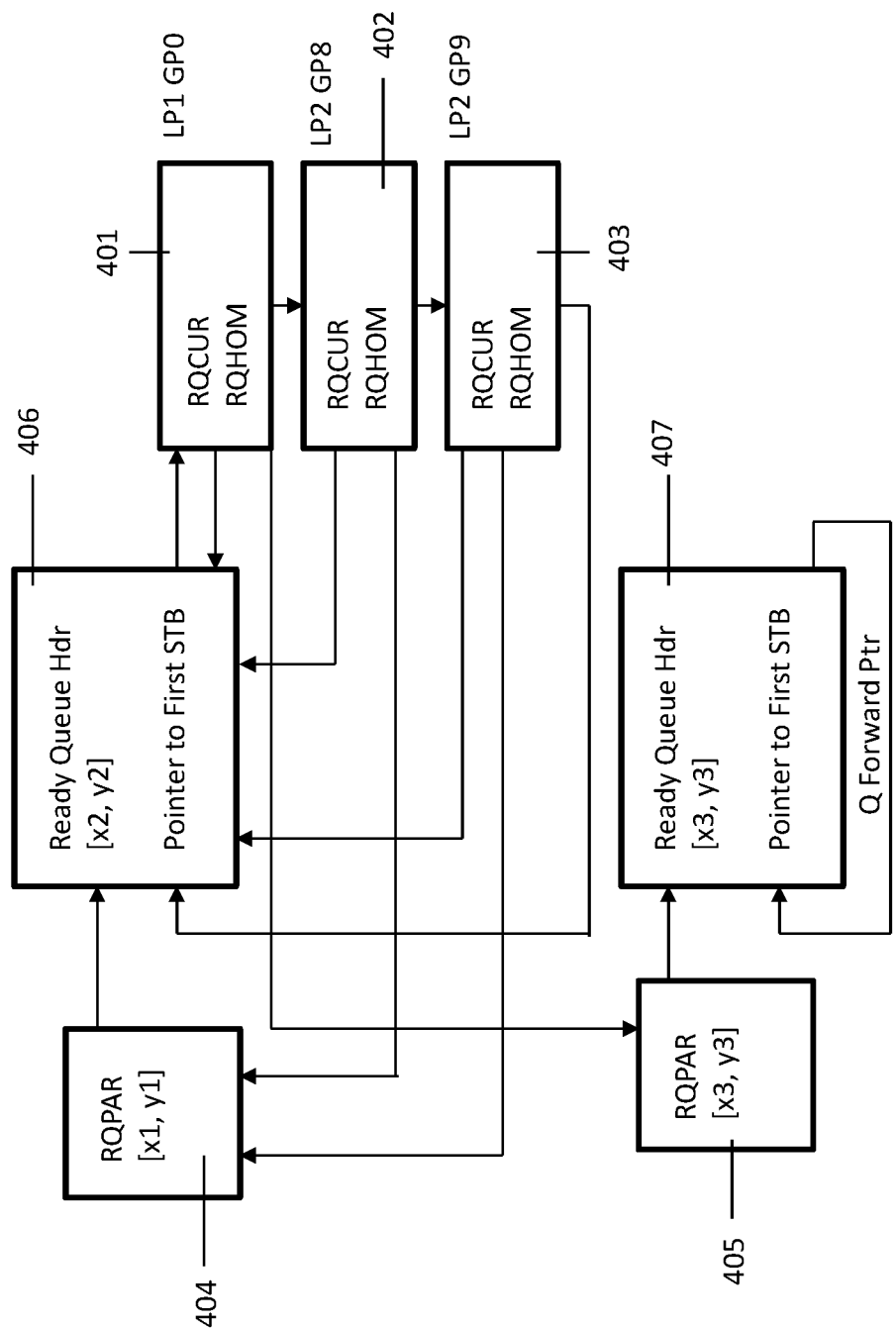
FIG. 4 depicts a block diagram of a process management system for use in implementing one or more embodiments of the present invention.

FIG. 4 is a block diagram illustrating a redirection of logical processors to ready queues. Logical processor blocks 401, 402, 403 are configured to point to second ready queue pointer array elements 404, 405 and ready queue headers 406, 407. The logical processor blocks 401, 402, 403 are queued in order of priority of the instructions in the ready queue. The final logical processor block 403 is pointed back towards the ready queue header 406. Each logical processor block 401, 402, 403 is encoded with two ready queue identifiers. Each first identifier, RQCUR, is a direct pointer that points to the ready queue which is allocated to the respective logical processor block 401, 402, 403. Each second identifier, RQHOM, is a pointer to the next ready queue that the respective logical processor block 401, 402, 403 is eligible to be allocated to when it becomes available. The eligibility is dictated by an assignment of a drawer and a processor to a ready queue as indicated by the first ready queue pointer array element 307, 308. This assignment along with the logical processor's defined processor type determines which ready queue pointer array element is associated with which logical processor queue element. These assignments can change over time, even while an element is currently pointed to a ready queue.

FIG. 4 illustrates a situation in which the system initially allocated a ready queue to a processor and a drawer indexed as [x2, y2], but reallocated the ready queue to another drawer and physical processor type indexed as [x1, y1]. All three first identifiers point to the ready queue header 406. However, the second and third logical processor blocks 402, 403 have second identifiers that point to the ready queue pointer array element 404 for drawer [x1] and physical processor type [y1]. The first logical process block 401 has a second identifier that points to a ready queue pointer array element 405 for drawer [x3] and physical processor type [y3]. Modifying the assignment of the drawer and the physical processor type at the first ready queue pointer array element 304 also modifies the logical processor's 401 second identifier. This modification enables the logical processor 401 to be reallocated to drawer [x3] and physical processor type [y3] when it becomes available without having to modify the second ready queue pointer array element 404.

Figure 5:
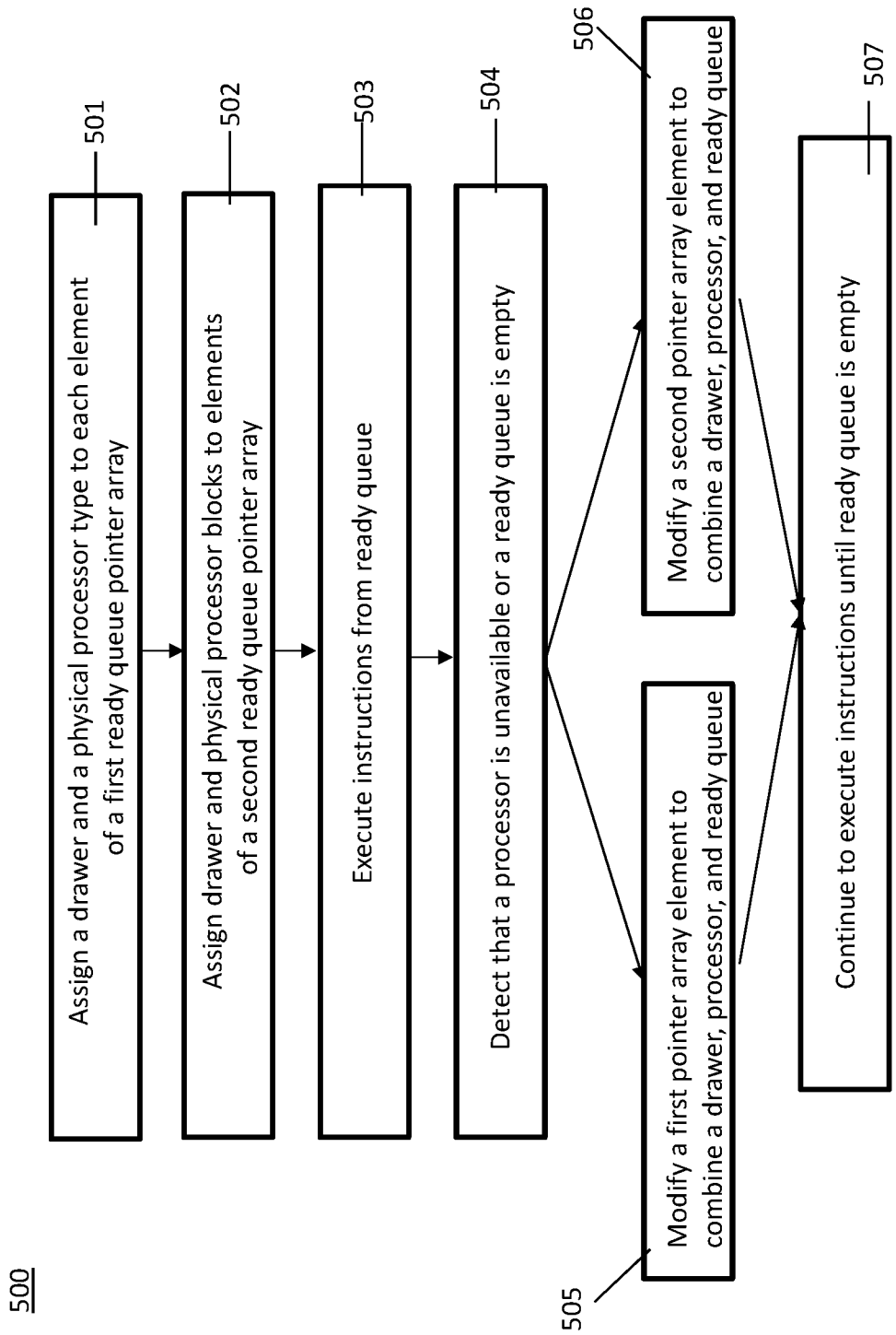
FIG. 5 depicts a flow diagram of a method for process management according to one or more embodiments of the invention.

FIG. 5 depicts a flow diagram of a method for process management according to one or more embodiments of the invention. The method 500 includes assigning a drawer and a physical processor type to each element of a first ready queue pointer array at block 501. Each element of the first ready queue pointer array can include a pointer for pointing the drawer and the physical processor type to a ready queue header. The ready queue header includes a pointer that points to a first instruction of a ready queue. The first ready queue pointer array describes the initial assignment of the drawer and the physical processor types. At block 502, the method further includes assigning the drawer, physical processor type, and ready queue header combination to each element of a second ready queue pointer array. At block 503, the processors execute instructions received from the ready queues. At block 504, the system detects that either processor has become unavailable or a ready queue is empty. At this point, the system allocates a processor to a ready queue having available instructions. The system can modify a first ready queue pointer array element to point to a ready queue header that is pointing to a ready queue with available instructions as seen in block 505. Alternatively, the system can modify a second ready queue pointer array element to point to a ready queue header that points to a ready queue with available instructions as seen in block 506. At block 507, the system continues to execute instructions until each ready queue is empty.

Additional processes may also be included. It should be understood that the processes depicted in FIG. 5 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for process management, the method comprising:
    assigning each physical processor of a plurality of physical processors to respective elements of a first ready queue pointer array and respective elements of a second ready queue pointer array, wherein a first element of the first ready queue pointer array is configured to point to a respective memory addresses of a first ready queue header, and wherein a first element of the second ready queue pointer array is configured to point to the same memory address as the first element of the first ready queue pointer array;
    detecting that a first physical processor of the plurality of physical processors is available to receive instructions, wherein the first physical processor is assigned to a second element of the first ready queue pointer array and a second element of the second ready queue pointer array, and wherein the second element of the second ready queue point array points to second ready queue header; and
    allocating the first physical processor to the first ready queue header by modifying the second element of the second ready queue pointer array.

2. The computer-implemented method of claim 1, wherein the assignments of the first ready queue pointer array and second ready queue pointer array are subdivided by a physical processor type.

3. The computer-implemented method of claim 1, wherein allocating the first physical processor to the ready queue with executable instructions comprises writing, from the first element of the first ready queue pointer array, a memory address of the first ready queue header to the second element of the second ready queue pointer array.

4. The computer-implemented method of claim 1, wherein allocating the first physical processor to the first ready queue comprises writing, to the second element of the first ready queue pointer array, a memory address of the first ready queue header.

5. The computer-implemented method of claim 1, the method further comprising configuring the first element of the first ready queue pointer array and the second element of the first ready queue pointer array to point to a memory address of a same ready queue header.

6. The computer-implemented method of claim 1, wherein each physical processor of the plurality of processor comprises at least one logical processor, and wherein each logical processor contains a first identifier that identifies a memory address of an element of the second ready queue pointer array that the logical processor is currently assigned; and a second identifier that identifies a memory address of a default element of the second ready queue pointer array.

7. The computer-implemented method of claim 6, the method further comprising:
    writing, to a pointer of the first element of the first ready queue pointer array, a memory address of a default ready queue header; and
    writing, to a pointer of a logical processor, the memory address of the default ready queue header.

8. A system for process management, the system comprising:
    a processor communicatively coupled to a memory, the processor configured to:
    assign each physical processor of a plurality of physical processors to respective elements of a first ready queue pointer array and respective elements of a second ready queue pointer array, wherein a first element of the first ready queue pointer array is configured to point to a respective memory addresses of a first ready queue header, and wherein a first element of the second ready queue pointer array is configured to point to the same memory address as the first element of the first ready queue pointer array;
    detect that a first physical processor of the plurality of physical processors is available to receive instructions, wherein the first physical processor is assigned to a second element of the first ready queue pointer array and a second element of the second ready queue pointer array, and wherein the second element of the second ready queue point array points to second ready queue header; and
    allocate the first physical processor to the first ready queue header by modifying the second element of the second ready queue pointer array.

9. The system of claim 8, wherein the processor is further configured to subdivide the assignments of the first ready queue pointer array and second ready queue pointer array by a physical processor type.

10. The system of claim 9, wherein allocating the first physical processor to the ready queue with executable instructions comprises writing, from the first element of the first ready queue pointer array, a memory address of the first ready queue header to the second element of the second ready queue pointer array.

11. The system of claim 9, wherein allocating the first physical processor and the first ready queue comprises writing, to the second element of the first ready queue pointer array, a memory address of the first ready queue header.

12. The system of claim 9, wherein the processor is further configured to cause the first element of the first ready queue pointer array and the second element of the first ready queue pointer array to point to a memory address of a same ready queue header.

13. The system of claim 9, wherein each physical processor comprises at least one logical processor, and wherein each logical processor contains a first identifier that identifies a memory address of an element of the second ready queue pointer array that the logical processor is assigned; and a second identifier that identifies a memory address of a default element of the second ready queue pointer array.

14. The system of claim 13, wherein the processor is further configured to:
    write, to a pointer of the first element of the first ready queue pointer array, a memory address of a default ready queue header; and
    write, to a pointer of a logical processor, the same memory address of the different default ready queue header.

15. A computer program product for process management, the computer product comprising a computer readable storage medium having program instructions embodied therewith, the instructions executable by a processor to cause the processor to:
    assign each physical processor of a plurality of physical processors to respective elements of a first ready queue pointer array and respective elements of a second ready queue pointer array, wherein a first element of the first ready queue pointer array is configured to point to a respective memory addresses of a first ready queue header, and wherein a first element of the second ready queue pointer array is configured to point to the same memory address as the first element of the first ready queue pointer array;
    detect that a first physical processor of the plurality of physical processors is available to receive instructions, wherein the first physical processor is assigned to a second element of the first ready queue pointer array and a second element of the second ready queue pointer array, and wherein the second element of the second ready queue point array points to second ready queue header; and
    allocate the first physical processor to the first ready queue by modifying the second element of the second ready queue pointer array.

16. The computer program product of claim 15, wherein the processor is further configured to subdivide the assignments of the first ready queue pointer array and second ready queue pointer array by a physical processor type.

17. The computer program product of claim 15, wherein allocating the first physical processor to the ready queue with executable instructions comprises writing, from the first element of the first ready queue pointer array element, the memory address of the first ready queue header to the second element of the second ready queue pointer array.

18. The computer program product of claim 15, wherein allocating the first physical processor and the first ready queue with comprises writing, to the second element of the first ready queue pointer array, a memory address of a ready queue header that is pointed to a ready queue with executable instructions.

19. The computer program product of claim 15, wherein the processor is further configured to cause the first element of the first ready queue pointer array and the second element of the first ready queue pointer array point to a memory address of a same ready queue header.

20. The computer program product of claim 15, wherein each physical processor comprises at least one logical processor, and wherein each logical processor contains a first identifier that identifies the memory address of an element of the second ready queue pointer array that the logical processor is assigned; and a second identifier that identifies a memory address of a default element of the second ready queue pointer array.

\* \* \* \* \*